US010067760B2

(12) United States Patent
Ryali et al.

(10) Patent No.: US 10,067,760 B2
(45) Date of Patent: Sep. 4, 2018

(54) SYSTEM AND METHOD FOR CLASSIFYING AND RESOLVING SOFTWARE PRODUCTION INCIDENTS

(71) Applicant: Wipro Limited, Bangalore (IN)

(72) Inventors: Premchand Ryali, Bangalore (IN); Shivamurthy Harave Guruswamappa, Chamarajanagar (IN); Ramkumar Balasubramanian, Bangalore (IN)

(73) Assignee: Wipro Limited, Bangalore (IN)

( * ) Notice: Subject to any disclaimer, the term of this patent is extended or adjusted under 35 U.S.C. 154(b) by 250 days.

(21) Appl. No.: 15/069,633

(22) Filed: Mar. 14, 2016

(65) Prior Publication Data

US 2017/0212756 A1    Jul. 27, 2017
US 2018/0032330 A9    Feb. 1, 2018

(30) Foreign Application Priority Data

Jan. 18, 2016  (IN) .............................. 201641001810

(51) Int. Cl.
| | |
|---|---|
| G06F 9/44 | (2018.01) |
| G06F 8/77 | (2018.01) |
| G06N 5/00 | (2006.01) |
| G06F 17/30 | (2006.01) |
| G06Q 10/06 | (2012.01) |
| G06F 8/20 | (2018.01) |

(Continued)

(52) U.S. Cl.
CPC ................. *G06F 8/77* (2013.01); *G06F 8/20* (2013.01); *G06F 8/60* (2013.01); *G06F 17/3069* (2013.01); *G06F 17/30707* (2013.01); *G06F 17/30713* (2013.01); *G06N 5/00* (2013.01); *G06Q 10/0631* (2013.01); *G06Q 10/101* (2013.01)

(58) Field of Classification Search
CPC ......................................................... G06F 9/44
USPC ................................................. 717/100–103
See application file for complete search history.

(56) References Cited

U.S. PATENT DOCUMENTS

| | | | | |
|---|---|---|---|---|
| 6,647,139 | B1 * | 11/2003 | Kunii ................. | G06K 9/00791 |
| | | | | 382/159 |
| 2001/0006892 | A1 * | 7/2001 | Barnett .................. | H04B 1/205 |
| | | | | 455/434 |

(Continued)

OTHER PUBLICATIONS

Altintas, et al., "Machine Learning Based Ticket Classification in Issue Tracking Systems", International Conference on Artificial Intelligence and Computer Science (AICS 2014), Sep. 15-16, 2014, pp. 195-207.

(Continued)

*Primary Examiner* — Jae U Jeon
(74) *Attorney, Agent, or Firm* — LeClairRyan PLLC

(57) ABSTRACT

A system and method for classifying and resolving software production incident tickets includes receiving an incident ticket, extracting a plurality of keywords from the incident ticket, and deriving a query vector corresponding to the incident ticket based on the plurality of keywords. The system and method further comprises classifying the incident ticket into at least one of a positive mechanization incident ticket and a negative mechanization incident ticket based on a comparison of the query vector and a plurality of vectors derived from a plurality of past incident tickets. The plurality of vectors are derived based on a plurality of keywords and their corresponding occurrences in the plurality of past incident tickets.

20 Claims, 7 Drawing Sheets

(51) Int. Cl.
  *G06F 8/60* (2018.01)
  *G06Q 10/10* (2012.01)

(56) References Cited

U.S. PATENT DOCUMENTS

| | | | |
|---|---|---|---|
| 2002/0157096 A1* | 10/2002 | Hane | G06F 17/30828 725/46 |
| 2004/0006736 A1* | 1/2004 | Kawatani | G06F 17/30011 715/256 |
| 2007/0244874 A1* | 10/2007 | Tawde | G06F 17/3071 |
| 2009/0240498 A1* | 9/2009 | Yih | G06F 17/2211 704/239 |
| 2010/0223671 A1* | 9/2010 | Tsuda | G06F 21/554 726/26 |
| 2011/0044431 A1* | 2/2011 | Klemm | H04M 1/72519 379/32.01 |
| 2011/0154123 A1* | 6/2011 | Barrall | G06F 11/0727 714/42 |
| 2012/0209847 A1* | 8/2012 | Rangan | G06F 17/3069 707/737 |
| 2013/0262082 A1* | 10/2013 | McKeeman | G06F 17/27 704/9 |

OTHER PUBLICATIONS

"Help Desk Ticket Categories: CREATE Help Desk Ticket Classification", Aug. 14, 2012.
Marquis, "How to Classify Incidents", Guide, Jul. 23, 2010, vol. 6.27.

* cited by examiner

SYSTEM AND METHOD FOR CLASSIFYING AND RESOLVING SOFTWARE PRODUCTION INCIDENTS

This application claims the benefit of Indian Patent Application Filing No. 201641001810, filed Jan. 18, 2016, which is hereby incorporated by reference in its entirety.

FIELD

This disclosure relates generally to information technology infrastructure management, and more particularly to system and method for classifying and resolving software production incident tickets.

BACKGROUND

In the current business environment, industries and enterprises are continuously looking for means and models to operate efficiently and to meet ever evolving customer demands. Digitization of various processes and activities in an industry or an enterprise is one such means that is being enabled by the advancements in the field of Information Technology (IT). This digitization is deployed using IT infrastructures that involve a complex combination of devices and software solutions. However, to derive the benefits of digitization, the IT infrastructures need to run smoothly.

Various tools have been designed and developed to monitor and/or predict any anomaly or malfunctioning in these IT infrastructures so that the anomaly can be resolved quickly and proactively. However, despite much advancement the resolutions provided by the support team are at times delayed and/or not accurate. Such delays accrue due to many reasons, among which few being the sheer load of unwanted and/or redundant alerts or tickets corresponding to various anomalies or defects in IT infrastructures that get logged requiring attention of the support team to resolve them quickly. Various existing optimization tools and techniques to address this concern still don't address the problem effectively. Hence, the technical support teams face the barrage of unwanted alerts or tickets to resolve and thereby limiting the time that is required to address the genuine and the critical alerts or tickets. These limitations, in turn, affect the overall functioning of the organization or the enterprise. Automation is one of way to resolve the alerts or tickets without human intervention so as to increase resolution efficiency and to reduce cost. However, identification of automation candidate among tickets and invoking corresponding resolution script still requires some manual efforts.

SUMMARY

In one embodiment, a method for classifying software production incident tickets is disclosed. In one example, the method comprises receiving an incident ticket. The method further comprises extracting a plurality of keywords from the incident ticket. The method further comprises deriving a query vector corresponding to the incident ticket based on the plurality of keywords. The method further comprises classifying the incident ticket into at least one of a positive mechanization incident ticket and a negative mechanization incident ticket based on a comparison of the query vector and a plurality of vectors derived from a plurality of past incident tickets. The plurality of vectors are derived based on a plurality of keywords and their corresponding occurrences in the plurality of past incident tickets.

In one embodiment, a system for classifying software production incident tickets is disclosed. In one example, the system comprises at least one processor and a memory communicatively coupled to the at least one processor. The memory stores processor-executable instructions, which, on execution, cause the processor to receive an incident ticket. The processor-executable instructions, on execution, further cause the processor to extract a plurality of keywords from the incident ticket. The processor-executable instructions, on execution, further cause the processor to derive a query vector corresponding to the incident ticket based on the plurality of keywords. The processor-executable instructions, on execution, further cause the processor to classify the incident ticket into at least one of a positive mechanization incident ticket and a negative mechanization incident ticket based on a comparison of the query vector and a plurality of vectors derived from a plurality of past incident tickets. The plurality of vectors are derived based on a plurality of keywords and their corresponding occurrences in the plurality of past incident tickets.

In one embodiment, a non-transitory computer-readable medium storing computer-executable instructions for classifying software production incident tickets is disclosed. In one example, the stored instructions, when executed by a processor, cause the processor to receive an incident ticket. The stored instructions, when executed by the processor, further cause the processor to extract a plurality of keywords from the incident ticket. The stored instructions, when executed by the processor, further cause the processor to derive a query vector corresponding to the incident ticket based on the plurality of keywords. The stored instructions, when executed by the processor, further cause the processor to classify the incident ticket into at least one of a positive mechanization incident ticket and a negative mechanization incident ticket based on a comparison of the query vector and a plurality of vectors derived from a plurality of past incident tickets. The plurality of vectors are derived based on a plurality of keywords and their corresponding occurrences in the plurality of past incident tickets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
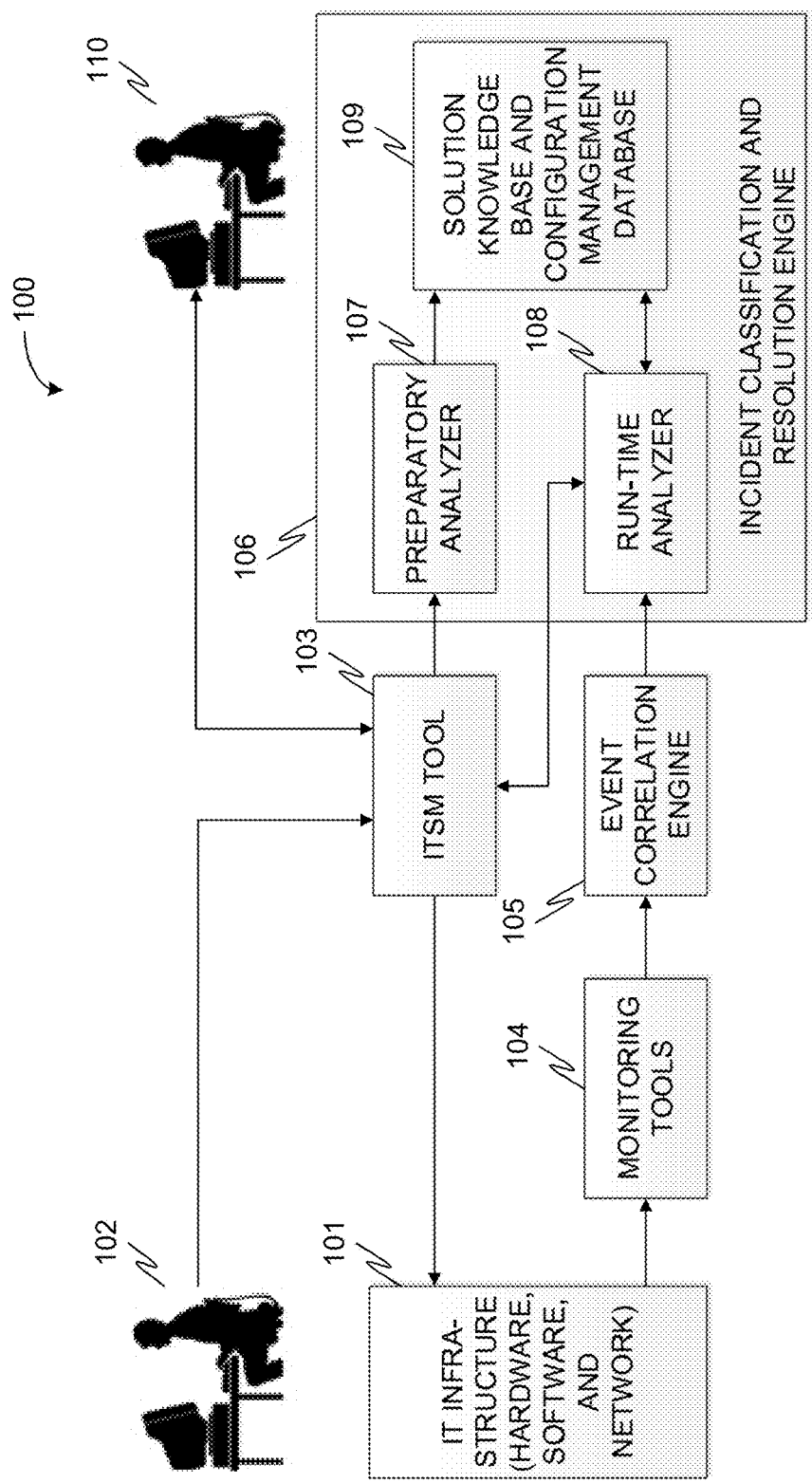
FIG. 1 is a block diagram of an exemplary system for classifying and resolving software production incident tickets in accordance with some embodiments of the present disclosure.

Referring now to FIG. 1, an exemplary system 100 for classifying and resolving software production incident tickets is illustrated in accordance with some embodiments of the present disclosure. The incident tickets correspond to anomalies, defects, or any other obstructions in an information technology (IT) infrastructure. In particular, the system 100 implements a technique for providing classification of incident tickets based on their mechanization or automation possibility, and for providing automatic resolution for the incident tickets for which mechanization or automation is possible.

The system 100 comprises an IT infrastructure 101 supporting an organization or an enterprise. The IT infrastructure 101 may include IT systems and devices interconnected by communication networks and running a host of software applications for managing the organization or the enterprise, enabling information processing like archival and retrieval, and enabling work processes, and so forth. Thus, the IT infrastructure 101 is a collection of hardware, software, and network resources. The hardware resources may be servers, computers, switches, routers, adopters, hubs, and so forth. The software resources may be operating systems, enterprise resource planning (ERP) solutions, customer relationship management (CRM) solutions, productivity applications, and so forth. The network resources may be Ethernet, Internet, firewall, communications protocols, and so forth. A number of users 102 such as network administrators, developers, end users, and so forth may operate or use the IT infrastructure 101 while performing day to day work in the organization or the enterprise.

The system 100 further comprises an IT service management (ITSM) tool 103. The ITSM tool 103 is a service level incident management tool where all incidents are logged as tickets in an incident repository. The ITSM tool 103 is responsible for receiving and processing the incident tickets so as to provide fast and accurate resolution. In some embodiments, the ITSM tool 103 may be build based on the IT infrastructure Library (ITIL) guidelines. Examples of ITSM tool 103 may include, but are not limited to, Wipro® eHelpline, BMC™ Remedy 9, ServiceNOW™, and so forth. The incident tickets are logged into ITSM tool 103 either automatically after monitoring and processing or manually. Thus, qualified events which are generated by any monitoring solution will be converted as an incident ticket. Similarly, a human user such as the user 102 may also log an incident ticket in the ITSM tool 103. System generated events or incident tickets are typically related to availability, capacity, performance of one or more components of the IT infrastructure 101 (e.g., memory utilization, CPU utilization, and so forth). Additionally, the events or incident tickets may be related to software or applications infrastructures (e.g., auto system scheduler issue, database refresh failure, long running query issue, and so forth), or may be related to hardware faults (e.g., network port Issue, LAN issue, and so forth).

The system 100 further comprises monitoring tools 104 for monitoring the IT infrastructure 101. The monitoring tool 104 monitors the behavior of a particular infrastructure component (server, application, etc.) with respect to a pre-defined threshold and/or after a pre-defined interval. It should be noted that, in many cases, one can easily identify the problem in the IT infrastructure 101 based on certain change in regular pattern or behavior. For example, the monitoring tool 104 may generate alerts for events whenever a threshold is reached. Thus, the monitoring tool 104 picks up problems or events corresponding to potential problems in the IT infrastructure 101. Examples of monitoring tool 104 may include, but are not limited to, Wipro® Viking, HP® OpenView, IBM® Tivoli, and so forth.

The system 100 further comprises an event correlation engine 105 for correlating multiple events detected by the monitoring tool 104 and to identify few events that are relevant and of importance based on a set of rules. For example, if a router is down, the underlying devices or application (e.g., computer, ERP) will be down as well. The monitoring tool 104 may generate alerts for the router as well as for the other underlying devices. However, the event correlation will indicate that router is the issue. The event correlation engine 105 processes the multiple events and analyzes relationships between events. The set of rules is then generated based on the analysis to suppress the unwanted events before logging the events as incident tickets. For example, the rules may include, but are not limited to, alert already exist, many to one alert, suppress by outage, and so forth.

The system further comprises an incident classification and resolution engine 106 for classifying and resolving software production incident tickets. As will be described in greater detail in conjunction with FIG. 2, the incident classification and resolution engine 106 classifies incident tickets based on their mechanization possibility, and subsequently provides automatic resolution for those incident tickets for which mechanization is possible. The incident classification and resolution engine 106 comprises a preparatory analyzer 107, a run-time analyzer 108, and a solution knowledge base (SK-Base) and configuration management database (CMDB) 109.

The preparatory analyzer 107 analyzes all the previously logged incident tickets in the ITSM 103 based on their mechanization status and derives vectors or feature matrices using natural language processing that are subsequently employed for identification or determination of possible mechanization candidates. The preparatory analyzer 107 then updates the SK-Base 109 with these vectors and feature matrices. Additionally, the preparatory analyzer 107 represents the mechanization solutions as knowledge in SK-Base, searches the availability of different mechanization solutions in the SK-Base, and accordingly updates the SK-Base.

The run-time analyzer 108 analyzes the alerts from the event correlation or ITSM and classifies the alerts into possibly mechanization candidates or not using natural language processing and based on the vectors or feature matrices built by the preparatory analyzer 107. Additionally, the run-time analyzer 108 acquires the knowledge about available mechanization solution from SK-Base 109 for the positive mechanization candidates and then maps the mechanization candidates towards the available mechanization solutions. Further, the run-time analyzer 108 updates the resolved information in ITSM tool 103 which then implements or applies the resolution in the IT infrastructure 101. Further, as will be appreciated by those skilled in the art, the run-time analyzer 108 updates the ITSM tool 103 with negative mechanization candidates. Such tickets are then picked up from ITSM tool 103 for manual resolution by a user 110 and the resolution is then updated in the ITSM tool 103 for subsequent implementation or application in the IT infrastructure 101.

The SK-Base 109 is a knowledge repository of vectors and/or feature matrices, and automation solutions (e.g., scripts). The solutions are indexed against the alert/ticket. The CMDB 109 is a configuration repository comprising information about configuration item (CI) of a particular location (e.g., IP address, etc.), capacity (e.g., server capacity, memory capacity, etc.), and other such information about the IT infrastructure. This information is employed by the ITSM tool 103 to implement the solution in the IT infrastructure 101.

Figure 2:
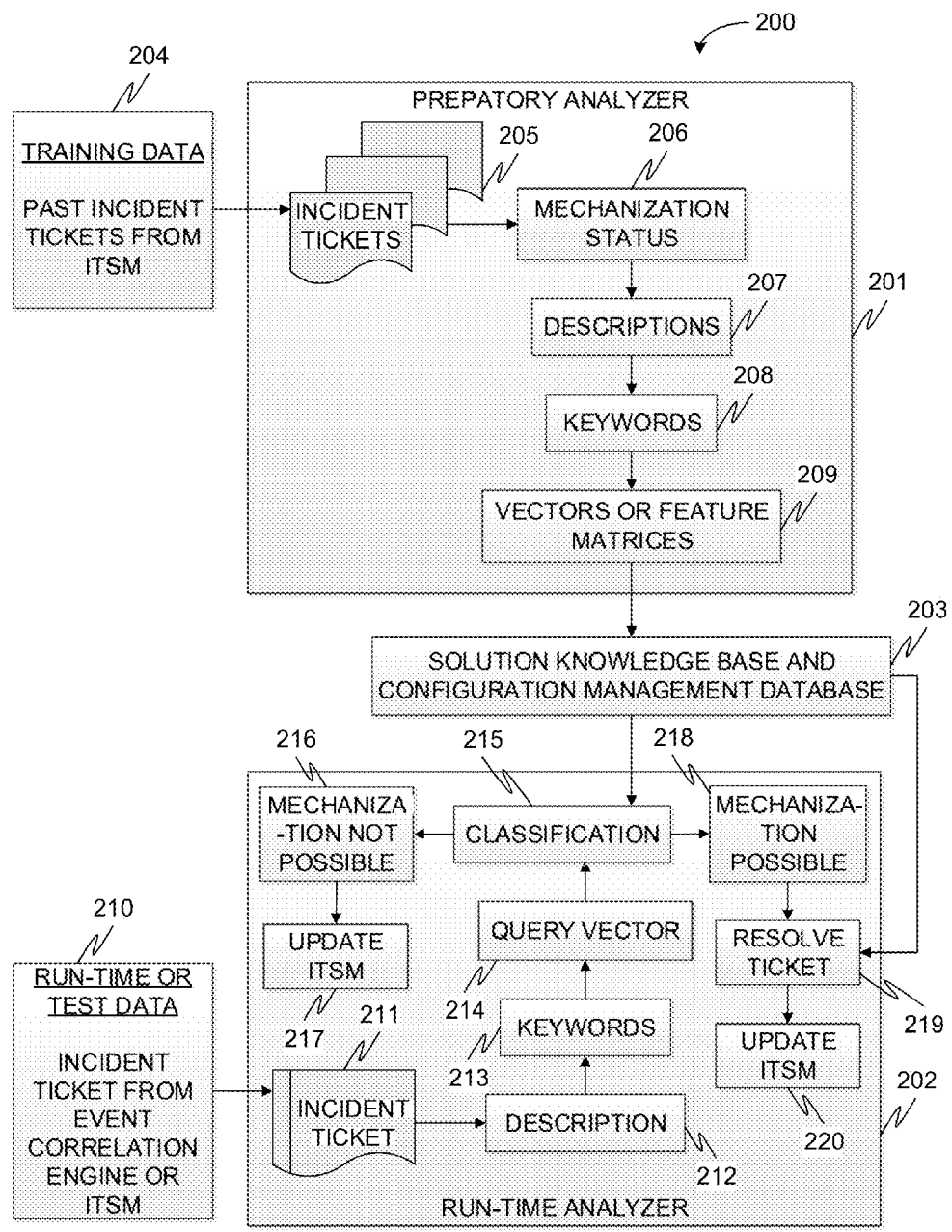
FIG. 2 is a functional block diagram of a classification and resolution engine in accordance with some embodiments of the present disclosure.

Referring now to FIG. 2, a functional block diagram of an incident classification and resolution engine 200 (analogous to the incident classification and resolution engine 106) implemented by the system 100 of FIG. 1 is illustrated in accordance with some embodiments of the present disclosure. As discussed above, the incident classification and resolution engine 200 comprises a preparatory analyzer 201 (analogous to the preparatory analyzer 107), a run-time analyzer 202 (analogous to the run-time analyzer 108), and a SK-Base and CMDB 203 (analogous to the SK-Base and CMDB 109). The preparatory analyzer 201 derives vectors and/or feature matrices based on past incident tickets while the run-time analyzer 202 determines if a current incident ticket is a mechanization candidate or not based on the vectors and/or the feature matrices. Further, SK-Base and CMDB 203 stores vectors, feature matrices, existing solutions or resolutions, mapping between positive mechanization incident tickets and the existing solutions, information about CI, and other such information.

The preparatory analyzer 201 acquires all the past (i.e., previously logged) incident tickets from the ITSM tool as training data at step 204. In some embodiments, the training data may be selected manually based on an empirical knowledge of the data. The manual selection may be performed in consultation with domain experts such as automation domain expert, operational engineers, and so forth. The past incident tickets 205 are then categorized based on their known mechanization status at step 206. Thus, all the past incident tickets are categorized in at least two categories or classes—category 1 being incident tickets for which mechanization is possible (i.e., positive samples having automated solutions) and category 2 being incident tickets for which mechanization is not possible (i.e., negative samples for which there is no automated solutions). For example, an incident ticket stating that 'a device has been stolen' is not a mechanization candidate as the device needs to be physically replaced. However, an incident ticket stating that 'memory utilization has exceeded a threshold value' may be a mechanization candidate as the resolution may be to run a script so as to clean up the memory. In some embodiments, the past incident tickets may be categorized into more than 2 categories based on their mechanization level—full mechanization possible, mechanization not possible, partial mechanization is possible (e.g., 40% mechanization, 60% mechanization, and so forth).

For each category, a description of each incident ticket is initially pre-processed at step 207 so as to determine a concise or a representative description while preserving the content, context, and meaning of that ticket. In some embodiments, the pre-processing may involve removing stop words (e.g., punctuations, numbers, and so forth) as they have little or no contribution to content, context, and meaning of the ticket, thereby leading to lower accuracy in subsequent classification. For example, from the incident ticket having description 'a device has been stolen', stop words such as 'has', 'been', as well as any punctuation mark may be removed. Further, in some embodiments, the pre-processing may involve stemming where different forms of same words in the description (e.g., device/devices, utilization/utilizes/utilizing, etc.) may be represented by one word (e.g., device, utilization, etc.). It should be noted that pre-processing may also involve other text processing techniques. Thus, for the incident ticket having description 'memory utilization has exceeded the threshold value on windows server', pre-processing may provide a concise or representative description as 'memory utilization exceed threshold window server' or as 'memory utilization'. Thus, for each category, we have multiple concise or representative descriptions corresponding to multiple incident tickets belonging to the given category.

Further, for each category, a number of keywords are extracted from the multiple concise descriptions belonging to the give category at step 208. For example, the keywords 'device' and 'stolen' may be extracted from the concise description 'device stolen' and the keywords 'memory', 'utilization', 'exceed', 'threshold', 'window', and 'server' may be extracted from 'memory utilization exceed threshold window server'. In some embodiments, at least three different training corpuses may be built using these keywords—training corpus comprising of all keywords (e.g., 'device', 'stolen', 'memory', 'utilization' etc.), training corpus comprising all noun keywords (e.g. 'device', 'CPU' 'memory' etc.), and training corpus comprising all verb keywords ('stolen', 'utilization' etc.). It should be noted that various other training corpuses depending on various other categorizations of keywords may also be employed in various other embodiments. Further, in some embodiments, each of the keywords may be represented by a unique number representation for ease of subsequent processing. For example, in some embodiments, each of the alphabets is assigned a unique number, and then an exponentiation and a subtraction operation may be employed on each of the alphabet based on the position of the alphabet in the keyword so as to determine the unique number representation. It should be noted that the choice of the exponentiation and the subtraction operation is because of their non-associative property. Thus, the unique number representation for the keyword 'device' may be determined as follows:

| A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |

Now, D→4 (p→1), e→5 (p→2), v→22 (p→3), i→9 (p→4), c→3 (p→5), and e→5 (p→6), where p is the position of alphabet within the keyword. The unique number representation for the keyword 'device' is therefore $4^1$-$5^2$-$22^3$-$9^4$-$3^5$-$5^6$ i.e. '−33098'. Similarly, unique number representations for the keyword 'CPU' is $3^1$-$16^2$-$21^3$ i.e. '−9514', for the keyword 'memory' is $13^1$-$5^2$-$13^3$-$15^4$-$18^5$-$25^6$ i.e. −246083027, and for the keyword 'utilization' is $21^1$-$20^2$-$9^3$-$12^4$-$9^5$-$26^6$-$1^7$-$20^8$-$9^9$-$15^{10}$-$14^{11}$ i.e., −4652511977448.

Further, for each category, a plurality of vectors is derived based on the plurality of keywords and their corresponding occurrences in plurality of past incident tickets at step 209. In some embodiments, the vectors may be derived for at least one of a mode, a median, and a range for the plurality of keywords. Thus, the vectors may be derived by iteratively extracting most commonly occurring keyword (i.e., mode), by iteratively extracting middle occurring keyword from keywords arranged in ascending or descending order of occurrence frequency (i.e., median), by iteratively extracting most and least commonly occurring keyword from keywords arranged in ascending or descending order of occurrence frequency (range). The size of each of the vectors (i.e., number of keywords in the vector) may be determined based on a pre-defined number (e.g., 50 keywords) or based on fulfillment of some pre-defined conditions (e.g., keywords that occur at least 50 times). It should be noted that various other vectors depending on occurrences of the keywords in past incident tickets may be derived in various other embodiments. In some embodiments, the plurality of vectors may be derived for each of the training corpuses i.e., all keywords, noun keywords, verb keywords. Thus, in some embodiments, there are 18 vectors in total—9 vectors for each category as follows:

Vector 1={mode of all keywords} of size m1 for category 1 (mechanization possible);
Vector 2={mode of all noun keywords} of size m2 for category 1;
Vector 3={mode of all verb keywords} of size m3 for category 1;
Vector 4={median of all keywords} of size m4 for category 1;
Vector 5={median of all noun keywords} of size m5 for category 1;
Vector 6={median of all verb keywords} of size m6 for category 1
Vector 7={range of all keywords} of size m7 for category 1;
Vector 8={range of all noun keywords} of size m8 for category 1;
Vector 9={range of all verb keywords} of size m9 for category 1;
Vector 10={mode of all keywords} of size m10 for category 2 (mechanization not possible);
Vector 11={mode of all noun keywords} of size m11 for category 2;
Vector 12={mode of all verb keywords} of size m12 for category 2;
Vector 13={median of all keywords} of size m13 for category 2;
Vector 14={median of all noun keywords} of size m14 for category 2;
Vector 15={median of all verb keywords} of size m15 for category 2;
Vector 16={range of all keywords} of size m16 for category 2;
Vector 17={range of all noun keywords} of size m17 for category 2;
Vector 18={range of all verb keywords} of size m18 for category 2.

Further, in some embodiments, for each category, one or more feature matrices may be derived based on the plurality of vectors. Each feature matrix is a set of vectors from the plurality of vectors. For example, in some embodiments, there are 6 matrices in total (3 matrices for each category) where matrix 1 may be collection of vector 1, vector 2, and vector 3 representing mode for all keywords, noun keywords, verb keywords for category 1, matrix 2 may be collection of vector 4, vector 5, and vector 6 representing median for all keywords, noun keywords, verb keywords for category 1, matrix 3 may be collection of vector 7, vector 8, and vector 9 representing range for all keywords, noun keywords, verb keywords for category 1, matrix 4 may be collection of vector 10, vector 11, and vector 12 representing mode for all keywords, noun keywords, verb keywords for category 2, matrix 5 may be collection of vector 13, vector 14, and vector 15 representing median for all keywords, noun keywords, verb keywords for category 2, and matrix 6 may be collection of vector 16, vector 17, and vector 18 representing range for all keywords, noun keywords, verb keywords for category 2. The derived vectors and/or feature matrices are stored in SK Base and CMDB 203 for subsequent use by the run-time analyzer 202 for classification of the current incident ticket into mechanization candidate or not. Further, as will be described in greater detail in conjunction with FIGS. 3 and 4, the preparatory analyzer 201 may index, store, and update existing mechanization solutions in the SK-Based 203 (i.e., knowledge repository) for subsequent resolution of the incident ticket for which mechanization is possible.

The run-time analyzer 202 receives the incident ticket from the ITSM tool or the event correlation engine as test data or run-time data at step 210. As stated above, the event correlation engine provides automatically captured incident tickets while the ITSM tool provides manually logged incident tickets to the run-time analyzer 202. The incident ticket 211 is then pre-processed at step 212 so as to extract a concise or a representative description of the ticket from the initially provided description. The pre-processing step 212 is similar to the pre-processing step 207 described above and may involve removing stop words (e.g., punctuations, numbers, etc.), stemming, and other such text processing techniques. Further, a number of keywords are extracted from the concise or the representative description at step 213. Further, in some embodiments, each of the keywords may be represented by a unique number representation for ease of subsequent processing. The step 213 is similar to the step 208 described above for extraction of keywords and for determining unique number representation for the extracted keywords. Further, a query vector is derived based on the plurality of keywords at step 214.

The incident ticket is then classified at step 215 into at least one of a positive mechanization incident ticket and a negative mechanization incident ticket based on a comparison of the query vector and the plurality of vectors or feature matrices. In some embodiments, the classification may be into more than 2 categories—full mechanization possible, mechanization not possible, partial mechanization is possible (e.g., 40% mechanization, 60% mechanization, and so forth). For classification, first the plurality of derived vectors and/or feature matrices is accessed from the SK Base and CMDB 203. In some embodiments, each of the derived vectors and/or the feature matrices may be normalized using the following equation:

$$\text{Normalized value} = \frac{\text{vector}[i, j]}{\sqrt{\sum_{i=1, j=1}^{i=n, j=m} (\text{vector}(i, j)^2)}}$$

where i and j represents position of individual word representation within the vectors and/or feature matrices while n and m represents size of the vectors and/or feature matrices. It should be noted that the value of i and therefore n is equal to 1 for the vectors while the value of n is equal to 3 for the feature matrices comprising of 3 vectors. Further, the size of the query vector (i.e., number of keywords in the query vector) is adjusted so as to be of same size as the vector or the feature matrix it is being compared with. This is achieved by populating the query vector with dummy keywords (e.g., '00000') till the size of adjusted query vector and the vector or the feature matrix it is being compared with is same. Additionally, the placements of original keywords within the adjusted query vector are further adjusted such that they correspond to the placements of those keywords within the vector or the feature matrix it is being compared with (i.e., the keywords are in same positions as that in the vector it is being compared with). For example, if the query vector comprises of keywords 'device' and 'stolen', and it is to be compared with the vector having 100 keywords where 'device' appears at 4th position and 'stolen' appears at 99th position, then the adjusted query vector will also comprises of 100 keywords comprising of 'device' at 4th position, 'stolen' at 99th position, and dummy keywords at rest of the positions.

In some embodiments, the classification comprises performing a nearest neighbor classification based on at least one of a similarity and a dissimilarity between the query vector and each of the plurality of vectors. In some embodiments, determining the similarity comprises determining a cosine similarity as follows:

$$\text{Cosine similarity} = \frac{Vector1 \cdot Vector2}{\|Vector1\| \|Vector2\|}$$

Further, in some embodiments, determining the dissimilarity comprises determining a Euclidean distance as follows:

$$\text{Euclidean distance} = \sqrt{(Vector1 - Vector2)^2}$$

where vector 1 is the query vector and vector 2 is the vector it is being compared with. The nearest neighbor classification is then performed by determining a decision parameter based on the cosine similarity and the Euclidean distance as follows:

$$\text{Decision parameter} = \frac{\text{Cosine similarity}}{\text{Euclidean distance}}$$

Thus, for example if two vectors are as follows:

| | | | | | |
|---|---|---|---|---|---|
| Vector 1 | 7 | 2 | 5 | 0 | 9 |
| Vector 2 | 0 | 2 | 3 | 2 | 4 |

$$\text{Cosine similarity} = \frac{7.0 + 2.2 + 5.3 + 0.2 + 9.4}{\sqrt{7^2 + 2^2 + 5^2 + 0^2 + 9^2} \times \sqrt{0^2 + 2^2 + 3^2 + 2^2 + 4^2}}$$

$$\text{Cosine similarity} = \frac{55}{12.60 \times 5.7}$$

Cosine similarity = 0.76

Euclidean distance =

$$\sqrt{(7-0)^2 + (2-2)^2 + (5-3)^2 + (0-2)^2 + (9-4)^2}$$

Euclidean distance = 9.05

$$\text{Decision parameter} = \frac{0.76}{9.05}$$

Decision parameter = 0.0839

In some embodiments, a plurality of decision parameters is calculated based on the query vector and each of 18 vectors (9 vectors with respect to category 1 and 9 vectors with respect to category 2) or 6 feature matrices (3 feature matrices with respect to category 1 and 3 feature matrices with respect to category 2) described above. An average value of the decision parameter is then calculated for 9 vectors with respect to category 1 or 3 feature matrices with respect to category 1. Similarly, an average value of the decision parameter is then calculated for 9 vectors with respect to category 2 or 3 feature matrices with respect to category 2. The incident ticket belongs to the category having higher value of average decision factor.

| Category 1 | Category 2 |
|---|---|
| Decision parameter 1 | Decision parameter 10 |
| Decision parameter 2 | Decision parameter 11 |
| Decision parameter 3 | Decision parameter 12 |
| Decision parameter 4 | Decision parameter 13 |
| Decision parameter 5 | Decision parameter 14 |
| Decision parameter 6 | Decision parameter 15 |
| Decision parameter 7 | Decision parameter 16 |
| Decision parameter 8 | Decision parameter 17 |
| Decision parameter 9 | Decision parameter 18 |
| Average decision parameter of category 1 | Average decision parameter of category 2 |

If the incident ticket belongs to category 2 representing tickets for which mechanization is not possible then it is a negative mechanization incident ticket 216 and the ITSM or the incident repository within ITSM is updated with the incident ticket at step 217. Such tickets may then be taken up for manual resolution. However, if the incident ticket belongs to category 1 representing tickets for which mechanization is possible then it is a positive mechanization incident ticket 218. In some embodiments, the run-time analyzer 202 resolves such incident ticket using an existing solution at step 219. As will be described in greater detail in conjunction with FIGS. 3 and 4, this is achieved by first identifying the existing solution from a plurality of existing solutions indexed in the SK-Base 203 (i.e., the knowledge repository) based on the incident ticket and then invoking one or more scripts associated with the existing solution to resolve the ticket. Subsequent to resolution, the ITSM or the incident repository within ITSM is updated with the incident ticket and the existing solution identified and implemented at step 220.

Figure 3:
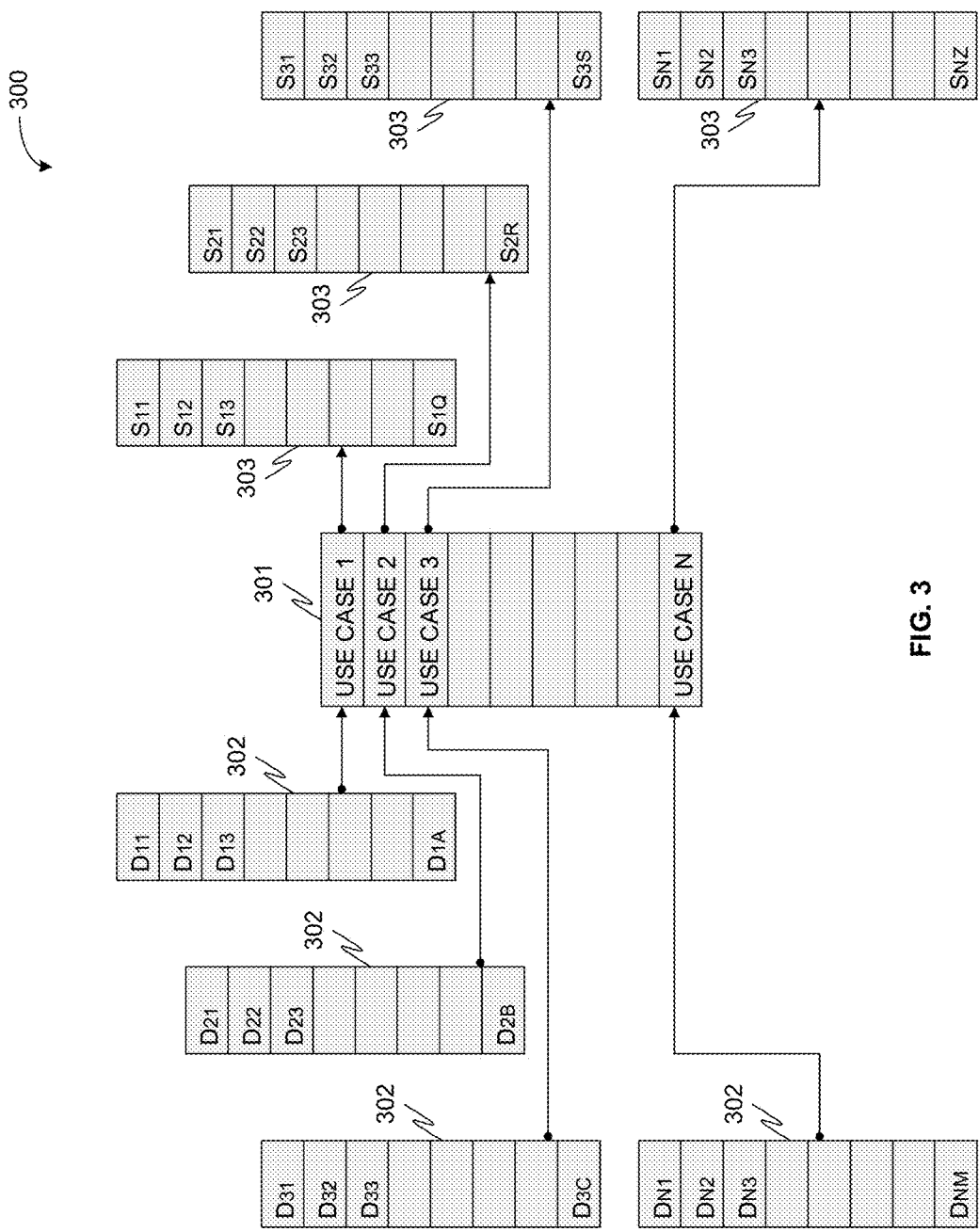
FIG. 3 illustrates an exemplary knowledge representation as stored in solution knowledge base.

Referring now to FIG. 3, the incident classification and resolution engine 200 stores the knowledge representation 300 of the all available mechanization solutions in the SK-Base 203 indexed against various positive mechanization tickets. As illustrated, each use case 301 representing positive mechanization tickets may be associated with different descriptions 302. Further, each use case 301 may have one or more associated scripts 303 as solution. The use case 301 is represented using similar representation (e.g., vector) as that of the incident ticket. For example, the use case 301 may be CPU utilization, memory utilization, database backup, and so forth. Alternatively, the use case 301 may be unique number representations of CPU utilization, memory utilization, database backup, and so forth. Thus, the use case 301 is a class representation of different tickets having different descriptions but belonging to one major class. All the descriptions 302 related to one use case 301 are combined into a corpus. For example, CPU utilization use case or class representation may correspond to descriptions such as 'CPU UTILIZATION has exceeded the threshold value on Windows Server', 'CPU UTILIZATION has exceeded the threshold value on VMware VM Windows 2008 Server Device', 'The threshold for the CPU has exceeded', and so forth. Similarly, memory utilization use case or class representation may correspond to descriptions such as 'MEMORY UTILIZATION has exceeded the threshold value on Windows Server', 'MEMORY UTILIZATION has exceeded the threshold value on Windows 2008 Server Device', 'CPU UTILIZATION, MEMORY UTILIZATION, WinWPX has exceeded the threshold value on VMware VM Windows 2003 Server Device', and so forth. Similarly, database backup use case or class representation may correspond to descriptions such as 'OVO PS Description: BACKUP failed to complete the command BACKUP DATABASE', 'MS SQL SERVER Description: BACKUP failed to complete the command BACKUP DATABASE', and so forth. Thus, it is the use case 301 that is matched against the query vector for identifying the existing solution. Once the use case is identified, the scripts associated with that use case is then invoked to resolve the incident ticket.

Figure 4:
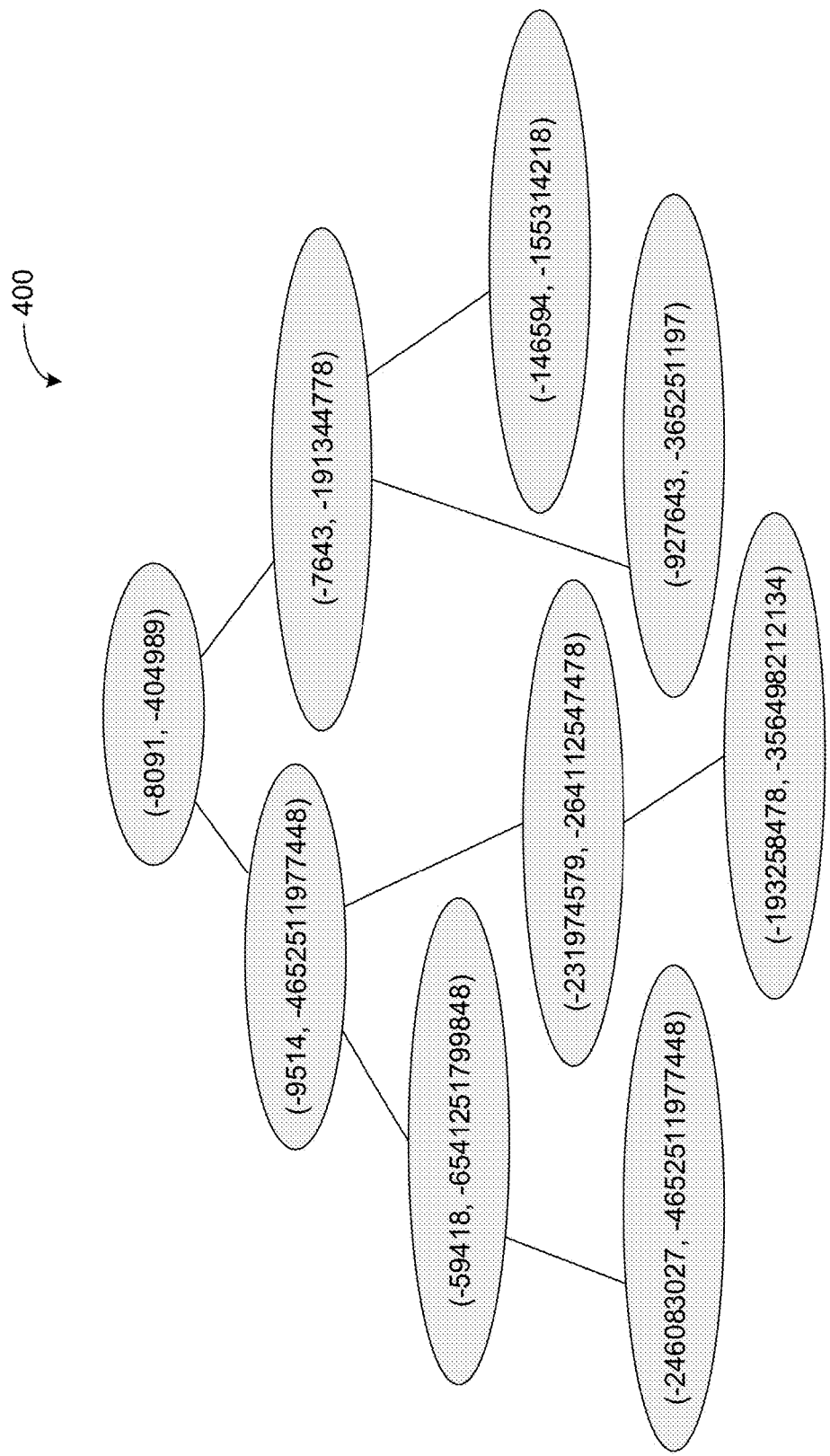
FIG. 4 illustrates an exemplary two-dimensional KD-tree for indexing the knowledge representation of FIG. 3.

Referring now to FIG. 4, the incident classification and resolution engine 200 employs a K dimensional tree or a KD-tree 400 for indexing the knowledge representation 300 of FIG. 3. The KD-tree 400 is a multilevel and multidimensional indexing structure and therefore able to support k-dimensional data points. In some embodiments, the preparatory analyzer 201 may employ mode values of all keywords (e.g., two or three most commonly occurring keywords) in the incident tickets belonging to each of the major classes as keys for indexing the use case. However, it should be noted that any other choice of values for keywords (e.g., median values or range values) may be equally employed as keys to represent the use cases. In the illustrated figure, KD-tree 400 is a two-dimensional tree (i.e., k=2) with two mode values being employed as the keys for indexing the use cases (e.g., CPU utilization, memory utilization, database backup, and so forth). Further, the unique number representations may be employed to represent the keys. Thus, for example, the key for use case 'CPU utilization' is (−9514, −4652511977448) and that for memory utilization is (−246083027, −4652511977448) as the unique number representations of CPU is −9514, memory is −246083027, and utilization is −4652511977448. The KD-tree 400 may then be created through insertion. Subsequently, balancing of the KD-tree 400 may be performed for fast retrieval of use cases and therefore associated solutions. It should be noted that the dimensions of the KD-tree 400 as well as choice of keys are user-defined and dependent on the number of words needed to represent the use cases. For example, in the illustrated two-dimensional KD-tree 400, all the use cases are represented by two words. However, in some embodiments, the use cases may be represented by three words or n number of words resulting in three-dimensional or n-dimensional KD-tree. It should be noted that, in some embodiments, all the use cases should be represented by same number of keywords. Alternatively, in some embodiments, the use cases may be represented by different number of words and default words (e.g., '00000') may be employed to equalize the number of words so as to index the use cases via a KD-tree 400.

As will be appreciated by one skilled in the art, a variety of processes may be employed for classifying and resolving software production incident tickets. For example, the exemplary system 100 and the associated incident classification and resolution engine 200 may classify and resolve software production incident tickets by the processes discussed herein. In particular, as will be appreciated by those of ordinary skill in the art, control logic and/or automated routines for performing the techniques and steps described herein may be implemented by the system 100 and the associated incident classification and resolution engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 5:
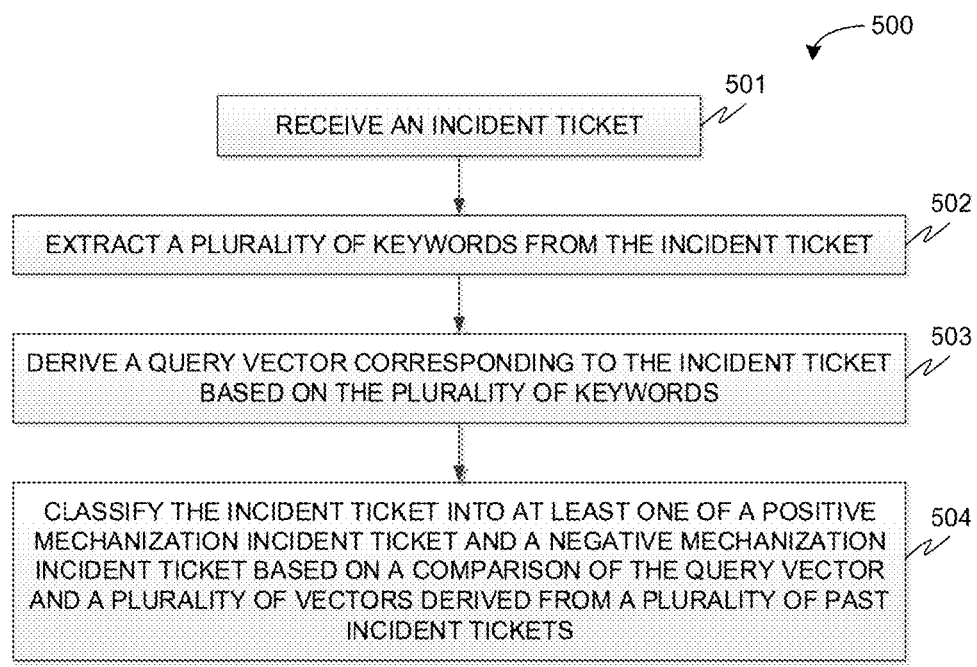
FIG. 5 is a flow diagram of an exemplary process for classifying and resolving software production incident tickets in accordance with some embodiments of the present disclosure.

For example, referring now to FIG. 5, exemplary control logic 500 for classifying and resolving software production incident tickets by a system, such as system 100, is depicted by a flowchart in accordance with some embodiments of the present disclosure. As illustrated in the flowchart, the control logic 500 includes the steps of receiving an incident ticket at step 501, extracting a plurality of keywords from the incident ticket at step 502, and deriving a query vector corresponding to the incident ticket based on the plurality of keywords at step 503. The control logic 500 further includes the steps of classifying the incident ticket into at least one of a positive mechanization incident ticket and a negative mechanization incident ticket based on a comparison of the query vector and a plurality of vectors derived from a plurality of past incident tickets at step 504. The plurality of vectors are derived based on a plurality of keywords and their corresponding occurrences in the plurality of past incident tickets.

In some embodiments, the control logic 500 further includes the step of determining a unique number representation for each of the plurality of keywords. Further, in some embodiments, the control logic 500 further includes the step of deriving the plurality of vectors from the plurality of past incident tickets by categorizing the plurality of past incident tickets in an incident repository into at least two category based on a mechanization status, extracting the plurality of keywords from the plurality of past incident tickets for each category, and deriving the plurality of vectors based on the plurality of keywords and their corresponding occurrences in plurality of past incident tickets for each category. In some embodiments, deriving the plurality of vectors comprises deriving the plurality of vectors for at least one of all keywords, noun keywords, and verb keywords. Further, in some embodiments, deriving the plurality of vectors comprises deriving the plurality of vectors for at least one of a mode, a median, and a range for the plurality of keywords.

Further, in some embodiments, deriving the plurality of vectors comprises normalizing each of the plurality of vectors.

In some embodiments, extracting the plurality of keywords at step 502 comprises pre-processing the incident ticket for stemming or for removing at least one of a stop word (e.g., punctuations, numbers, etc.). Further, in some embodiments, classifying at step 504 comprises performing a nearest neighbor classification based on at least one of a similarity and a dissimilarity between the query vector and the plurality of vectors. In some embodiments, the similarity comprises a cosine similarity, the dissimilarity comprises a Euclidean distance, and performing the nearest neighbor classification comprises determining a decision parameter based on the cosine similarity and the Euclidean distance. Further, in some embodiments, classifying at step 504 further comprises deriving one or more feature matrices based on the plurality of vectors, and comparing the query vector and the one or more feature matrices.

In some embodiments, the control logic 500 further includes the step of resolving the incident ticket using an existing solution for the positive mechanization incident ticket by identifying the existing solution from a plurality of existing solutions indexed in a knowledge repository based on the incident ticket, and invoking one or more scripts associated with the existing solution. Further, in some embodiments, the control logic 500 further includes the step of updating the incident repository with the incident ticket and, for the positive mechanization incident ticket, with the existing solution.

Figure 6:
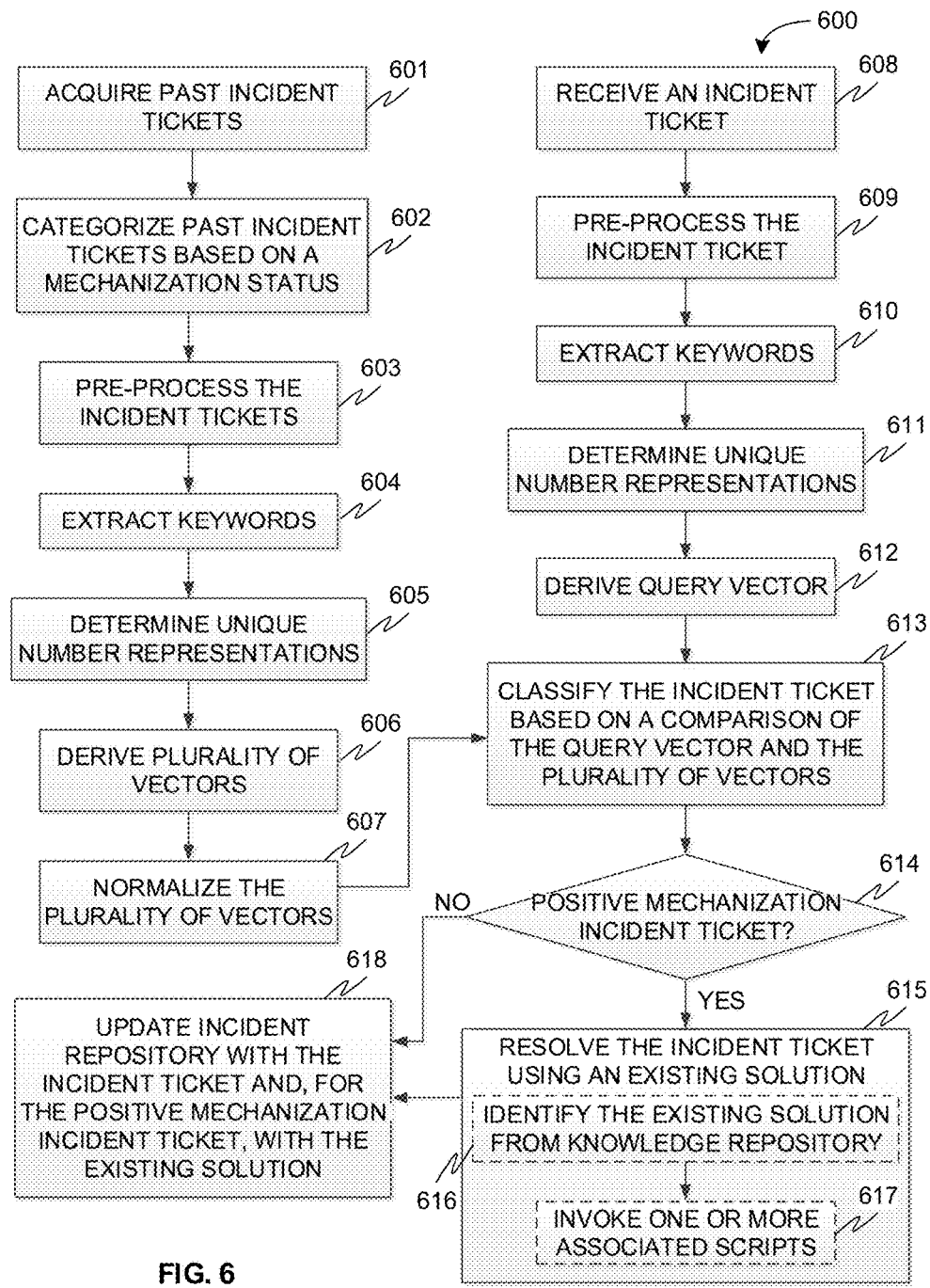
FIG. 6 is a flow diagram of a detailed exemplary process for classifying and resolving software production incident tickets in accordance with some embodiments of the present disclosure.

Referring now to FIG. 6, exemplary control logic 600 for classifying and resolving software production incident tickets is depicted in greater detail by a flowchart in accordance with some embodiments of the present disclosure. As illustrated in the flowchart, the control logic 600 includes the steps of acquiring past incident tickets from the ITSM at step 601, and categorizing the past incident tickets into at least 2 categories based on their corresponding mechanization status at step 602. The control logic 600 further includes the steps of pre-processing the incident tickets for each category at step 603, extracting keywords from pre-processed incident tickets for each category at step 604, and determining unique number representations for each of the plurality of keywords for each category at step 605. The control logic 600 further includes the step of deriving a plurality of vectors based on the plurality of keywords and their corresponding occurrences in plurality of past incident tickets for each category at step 606. The vectors may be derived for different training corpuses of keywords (e.g., all keywords, noun keywords, verb keywords, etc.) and for different types of frequency of occurrences (e.g., mode, median, range, etc.). In some embodiments, feature matrices may be derived based on the plurality of vectors for each category. The control logic 600 further includes the step of normalizing each of the plurality of vectors and/or feature matrices at step 607.

Additionally, the control logic 600 includes the steps of receiving an incident ticket from the event correlation engine or the ITSM at step 608, pre-processing the incident ticket at step 609, extracting keywords from pre-processed incident ticket at step 610, determining unique number representations for each of the plurality of keywords at step 611, and deriving a query vector based on the plurality of keywords at step 612. The control logic 600 further includes the step of classifying the incident tickets into at least one of a positive mechanization incident ticket and a negative mechanization incident ticket based on a comparison of the query vector and the plurality of vectors or the feature matrices at step 613. The classification involves performing a nearest neighbor classification by determining a decision parameter based on the cosine similarity and the Euclidean distance.

The control logic 600 further includes the step of determining if the incident ticket is a positive mechanization incident ticket or not at step 614. If the incident ticket is positive mechanization incident ticket, then the control logic 600 includes the step of resolving the incident ticket using an existing solution at step 615. In some embodiments, resolving at step 615 may further comprise identifying the existing solution from a plurality of existing solutions indexed in a knowledge repository (i.e., SK-Base) at step 616, and invoking one or more scripts associated with the existing solution at step 617. The control logic 600 further includes the step of updating the incident repository within ITSM with the incident ticket and the associated resolution (i.e., existing solution) at step 618. The ITSM may subsequently implement the provided resolution. However, if the incident ticket is not a positive mechanization incident ticket, then the control logic 600 directly flows to step 618 and updates the incident repository within ITSM with the incident ticket. In such cases, the incident ticket is taken for manual resolution.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
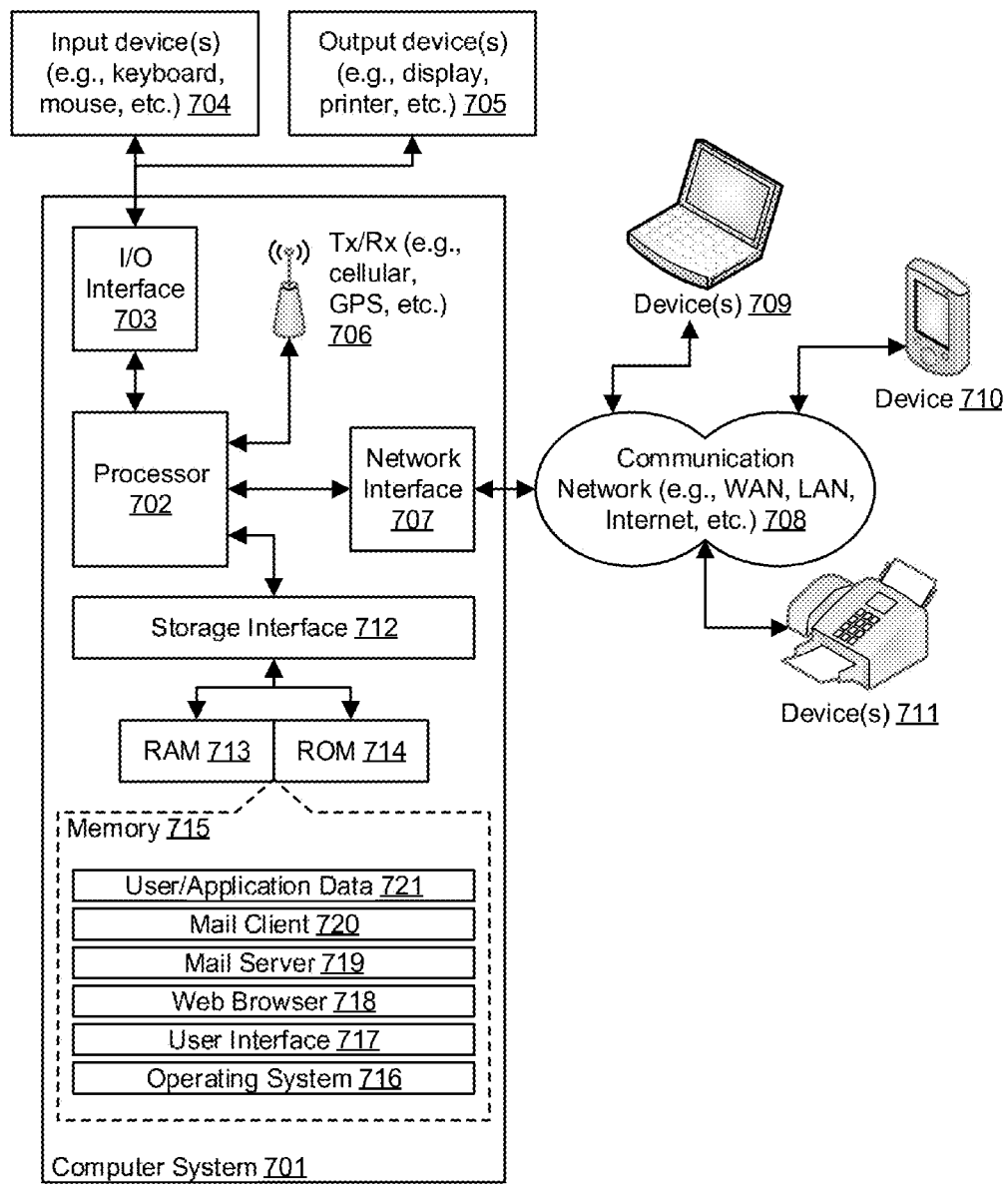
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100 and incident classification and resolution engine 200 for classifying and resolving software production incident tickets. Computer system 701 may comprise a central processing unit ("CPU" or "processor") 702. Processor 702 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., incident tickets, keywords, unique number representations of keywords, vectors, feature matrices, mechanization statuses, use cases, descriptions, scripts, configuration item, KD-tree, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above result in automated, efficient, and speedy resolution of tickets based on intelligent classification. The identification of automation candidates through the classification reduces the human error and the time delay of providing accurate resolution. In other words, the techniques described in the various embodiments discussed above increase the productivity of the automation solutions while at the same time reduce the manual effort.

The specification has described system and method for classifying and resolving software production incident tickets. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for classifying software production incident tickets, the method comprising:
    extracting, by a processor, a plurality of keywords from an incident ticket; deriving, by the processor, a query vector corresponding to the incident ticket based on the plurality of keywords; and
    classifying, by the processor, the incident ticket into at least one of a positive mechanization incident ticket and a negative mechanization incident ticket based on a comparison of the query vector and a plurality of vectors derived from a plurality of past incident tickets, wherein the comparison comprises at least
    adjusting the size of query vector by populating the query vector with dummy keywords, such that the query vector is of the same size as a vector from the plurality of vectors with which the comparison is to be performed, and
    adjusting the placement of the keywords within the query vector such that the adjusted keywords correspond to the placements of similar keywords within the vector from the plurality of vectors, and wherein the plurality of vectors are derived based on a plurality of keywords, and their corresponding occurrences in the plurality of past incident tickets, wherein the adjusted keywords are in the same positions as the similar keywords within the vector from the plurality of vectors.

2. The method of claim 1, wherein the extracting the plurality of keywords further comprises pre-processing, by the processor, the incident ticket for stemming or for removing at least one stop word.

3. The method of claim 1, further comprising determining, by the processor, a unique number representation for each of the plurality of keywords.

4. The method of claim 1, further comprising deriving the plurality of vectors from the plurality of past incident tickets by:
    categorizing, by the processor, the plurality of past incident tickets in an incident repository into at least two category based on a mechanization status;
    extracting, by the processor, for each category the plurality of keywords from the plurality of past incident tickets; and
    deriving, by the processor, for each category the plurality of vectors based on the plurality of keywords and their corresponding occurrences in plurality of past incident tickets.

5. The method of claim 4, wherein the deriving the plurality of vectors further comprises deriving, by the processor, the plurality of vectors for at least one of all keywords, noun keywords, or verb keywords.

6. The method of claim 4, wherein the deriving the plurality of vectors further comprises deriving, by the processor, the plurality of vectors for at least one of a mode, a median, or a range for the plurality of keywords.

7. The method of claim 4, wherein the deriving the plurality of vectors further comprises normalizing, by the processor, each of the plurality of vectors.

8. The method of claim 1, wherein the classifying further comprises performing, by the processor, a nearest neighbor classification based on at least one of a similarity and a dissimilarity between the query vector and the plurality of vectors.

9. The method of claim 8, wherein the similarity comprises a cosine similarity, wherein the dissimilarity comprises a Euclidean distance, and wherein the performing the nearest neighbor classification further comprises determining, by the processor, a decision parameter based on the cosine similarity and the Euclidean distance.

10. The method of claim 1, wherein the classifying further comprises deriving, by the processor, one or more feature matrices based on the plurality of vectors and comparing the query vector and the one or more feature matrices.

11. The method of claim 1, further comprising resolving, by the processor, the incident ticket using an existing solution for the positive mechanization incident ticket by:
identifying, by the processor, the existing solution from a plurality of existing solutions indexed in a knowledge repository based on the incident ticket; and
invoking, by the processor, one or more scripts associated with the existing solution.

12. The method of claim 11, further comprising updating, by the processor, the incident repository with the incident ticket and, for the positive mechanization incident ticket, with the existing solution.

13. A software production incident ticket classification computing apparatus comprising memory and one or more processors configured to be capable of executing programmed instructions stored in the memory to:
extract a plurality of keywords from an incident ticket;
derive a query vector corresponding to the incident ticket based on the plurality of keywords;
classify the incident ticket into at least one of a positive mechanization incident ticket and a negative mechanization incident ticket based on a comparison of the query vector and a plurality of vectors derived from a plurality of past incident tickets, wherein the comparison comprises at least
adjusting the size of query vector by populating the query vector with dummy keywords, such that the query vector is of the same size as a vector from the plurality of vectors with which the comparison is to be performed, and
adjusting the placement of the keywords within the query vector such that the adjusted keywords correspond to the placements of similar keywords within the vector from the plurality of vectors, and wherein the plurality of vectors are derived based on a plurality of keywords and their corresponding occurrences in the plurality of past incident tickets, wherein the adjusted keywords are in the same positions as the similar keywords within the vector from the plurality of vectors.

14. The apparatus of claim 13, wherein the one or more processors are further configured to be capable of executing the programmed instructions stored in the memory to determine a unique number representation for each of the plurality of keywords.

15. The apparatus of claim 13, wherein the one or more processors are further configured to be capable of executing the programmed instructions stored in the memory to:
derive the plurality of vectors from the plurality of past incident tickets that further comprises programmed instructions to:
categorize the plurality of past incident tickets in an incident repository into at least two category based on a mechanization status;
extract for each category the plurality of keywords from the plurality of past incident tickets; and
derive for each category the plurality of vectors based on the plurality of keywords and their corresponding occurrences in plurality of past incident tickets.

16. The apparatus of claim 15, wherein the derive the plurality of vectors further comprises the one or more processors being further configured to be capable of executing the programmed instructions stored in the memory to:
derive the plurality of vectors for at least one of all keywords, noun keywords, or verb keywords.

17. The apparatus of claim 15, wherein the derive the plurality of vectors further comprises the one or more processors being further configured to be capable of executing the programmed instructions stored in the memory to:
derive the plurality of vectors for at least one of a mode, a median, or a range for the plurality of keywords.

18. The apparatus of claim 13, wherein the classify the incident ticket into at least one of the positive mechanization incident ticket and the negative mechanization incident ticket further comprises the one or more processors being further configured to be capable of executing the programmed instructions stored in the memory to:
perform a nearest neighbor classification based on at least one of a similarity and a dissimilarity between the query vector and the plurality of vectors, wherein the similarity comprises a cosine similarity, wherein the dissimilarity comprises a Euclidean distance, and wherein the performing the nearest neighbor classification comprises determining a decision parameter based on the cosine similarity and the Euclidean distance.

19. The apparatus of claim 13, wherein the one or more processors are further configured to be capable of executing the programmed instructions stored in the memory to:
resolve the incident ticket using an existing solution for the positive mechanization incident ticket that further comprises programmed instructions to:
identify the existing solution from a plurality of existing solutions indexed in a knowledge repository based on the incident ticket; and
invoke one or more scripts associated with the existing solution.

20. A non-transitory computer readable medium having stored thereon instructions for classifying software production incident tickets comprising executable code which when executed by one or more processors, causes the processors to perform steps comprising:
extracting a plurality of keywords from an incident ticket;
deriving a query vector corresponding to the incident ticket based on the plurality of keywords;
classifying the incident ticket into at least one of a positive mechanization incident ticket and a negative mechanization incident ticket based on a comparison of the query vector and a plurality of vectors derived from a plurality of past incident tickets, wherein the comparison comprises at least
adjusting the size of query vector by populating the query vector with dummy keywords, such that the query vector is of the same size as a vector from the plurality of vectors with which the comparison is to be performed, and adjusting the placement of the keywords within the query vector such that the adjusted keywords correspond to the placements of similar keywords within the vector from the plurality of vectors, and wherein the plurality of vectors are derived based on a plurality of keywords and their corresponding occurrences in the plurality of past incident tickets, wherein the adjusted keywords are in the same positions as the similar keywords within the vector from the plurality of vectors.

\* \* \* \* \*